US008811908B2

(12) United States Patent
Yoon et al.

(10) Patent No.: US 8,811,908 B2
(45) Date of Patent: Aug. 19, 2014

(54) METHOD AND APPARATUS FOR EXPANDING WIRELESS REAR SPEAKER IN HOME THEATER SYSTEM

(75) Inventors: Eung-sik Yoon, Suwon-si (KR); Sung-han Lee, Hwaseong-si (KR); Yong-jin Kang, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1919 days.

(21) Appl. No.: 11/650,943

(22) Filed: Jan. 9, 2007

(65) Prior Publication Data

US 2008/0008338 A1 Jan. 10, 2008

(30) Foreign Application Priority Data

Jul. 10, 2006 (KR) ........................ 10-2006-0064462

(51) Int. Cl.
*H04B 7/00* (2006.01)

(52) U.S. Cl.
USPC ............................. 455/66.1; 381/79; 381/303

(58) Field of Classification Search
CPC ......................................................... H04S 3/00
USPC ...................... 455/66.1, 90, 130; 381/79, 303
See application file for complete search history.

(56) References Cited

U.S. PATENT DOCUMENTS 4,588,979 A * 5/1986 Adams .......................... 341/131
4,949,048 A * 8/1990 Tokumo et al. ................. 330/10
6,456,968 B1 * 9/2002 Taniguchi et al. ............ 704/229
6,608,907 B1 8/2003 Lee
6,697,464 B1 * 2/2004 Nelson et al. .............. 379/93.05
2004/0148445 A1 * 7/2004 Lee et al. ........................ 710/72
2004/0264708 A1 * 12/2004 Dupeire .......................... 381/79
2006/0132715 A1 * 6/2006 Ho et al. ......................... 353/15

FOREIGN PATENT DOCUMENTS

KR 1997-0048070 7/1997
KR 100268473 10/2000
KR 20020080153 10/2002
KR 20050003091 1/2005
WO 2005/032210 4/2005

OTHER PUBLICATIONS

Korean Notice of Allowance Issued on Jun. 28, 2007 in KR Patent Application No. 10-2006-0064462.

* cited by examiner

*Primary Examiner* — Hsin-Chun Liao
(74) *Attorney, Agent, or Firm* — Stanzione & Kim, LLP

(57) ABSTRACT

A wireless rear speaker expanding apparatus which allows wired rear speakers to expand as wireless rear speakers by attaching a card-type wireless module in a home theater system includes a main body unit to reproduce a multi-channel audio stream from a recording medium, to extract a rear channel audio stream, to detect whether a transmission module unit is mounted, and to switch the rear channel audio stream to a wireless transmission mode or a wired transmission mode, a transmission module unit to modulate the rear channel audio stream extracted from the main body unit into a wireless signal and to wirelessly transmit the signal, if mounted as a detachable card-type unit on the main body unit, and a reception module unit to decode the rear channel audio stream wirelessly transmitted from the transmission module, and to amplify the decoded signal as a rear channel audio signal.

7 Claims, 7 Drawing Sheets

METHOD AND APPARATUS FOR EXPANDING WIRELESS REAR SPEAKER IN HOME THEATER SYSTEM

CROSS-REFERENCE TO RELATED APPLICATION

This application claims the benefit of Korean Application No. 2006-64462, filed Jul. 10, 2006, in the Korean Intellectual Property Office, the disclosure of which is incorporated herein by reference.

BACKGROUND OF THE INVENTION

1. Field of the Invention

Aspects of the present invention relate to a home theater system, and more particularly, to a wireless rear speaker expanding apparatus and method which can expand wired rear speakers to wireless rear speakers by mounting a card-type wireless transmission module in a home theater system, and an audio device having the same.

2. Description of the Related Art

In general, a home theater system provides very high quality pictures and abundant sound sources, such as 5.1 channels, by using multimedia resources, such as high definition (HD) TVs and DVDs, and thus provides a basis on which images and sound equivalent to those in a theater can be enjoyed at home.

The audio apparatus of a conventional home theater system generally has 5.1 channels, including, for example, a center speaker, a left speaker, a right speaker, a rear left speaker, a rear right speaker, and a subwoofer speaker. The conventional home theater system connects a main body unit with rear speakers in order to output 5.1-channel audio signals.

However, since the main body is connected to the rear speakers of the conventional home theater system using cables, the installation space has to be limited, and the appearance of the home theater system can be spoiled.

SUMMARY OF THE INVENTION

Aspects of the present invention provide a wireless rear speaker expanding apparatus of a home theater system which selectively outputs a rear channel audio stream through wires or wirelessly according to whether a wireless transmission module is mounted in the home theater system.

Aspects of the present invention also provide an audio device which selectively outputs a rear channel audio stream through wires or wirelessly according to whether a wireless transmission module is mounted.

Aspects of the present invention also provide a wireless rear speaker expanding method which can expand wired rear speakers to wireless rear speakers by attaching or detaching a card-type wireless module in a home theater system.

Aspects of the present invention also provide a method of controlling an audio signal output which selectively outputs a multi-channel audio signal through wires or wirelessly by attaching or detaching a card-type wireless module.

Additional aspects and/or advantages of the invention will be set forth in part in the description which follows and, in part, will be obvious from the description, or may be learned by practice of the invention.

According to an aspect of the present invention, a wireless rear speaker expanding apparatus of a home theater audio system includes a main body unit to reproduce a multi-channel audio stream from a recording medium, to extract a rear channel audio stream, to detect whether a transmission module unit is mounted thereon, and to switch the rear channel audio stream to a wireless transmission mode and a wired transmission mode, a transmission module unit to modulate the rear channel audio stream extracted from the main body unit into a wireless signal and to wirelessly transmit the signal if mounted on the main body unit, and a reception module unit to receive and decode the rear channel audio stream wirelessly transmitted from the transmission module unit, and to amplify the decoded signal as a rear channel audio signal.

According to another aspect of the present invention, a wireless rear speaker expanding method of a home theater system having a wireless transmission module attachable and detachable to and from a main body includes confirming whether the wireless transmission module is mounted on the main body of the system, setting an identification (ID) for synchronization with a reception module to which a signal is wirelessly transmitted, and wirelessly transmitting rear channel audio data through the wireless transmission module if the wireless transmission module is mounted on the main body, and switching the rear channel audio data to a wired output mode if the wireless transmission module is not mounted on the main body.

According to another aspect of the present invention, a method of controlling output of a multi-channel audio signal by sensing whether a wireless transmission module unit is mounted to a main body unit includes sensing whether the wireless transmission module unit is mounted on the main body unit, wirelessly transmitting the multi-channel audio signal through the wireless transmission module unit if the wireless transmission module unit is sensed to be mounted on the main body unit; and outputting the multi-channel audio signal in a wired manner if the wireless transmission module unit is not sensed to be mounted on the main body unit.

According to another aspect of the present invention, a method of controlling an audio device in order to send an ID for wireless data communication between a main body and a reception module includes confirming whether a wireless communication module is mounted on the main body, setting an ID for synchronization with the reception module and transmitting the set ID to the reception module if the wireless transmission module unit is mounted on the main body, receiving ID information from the reception module, and releasing an ID setting mode.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
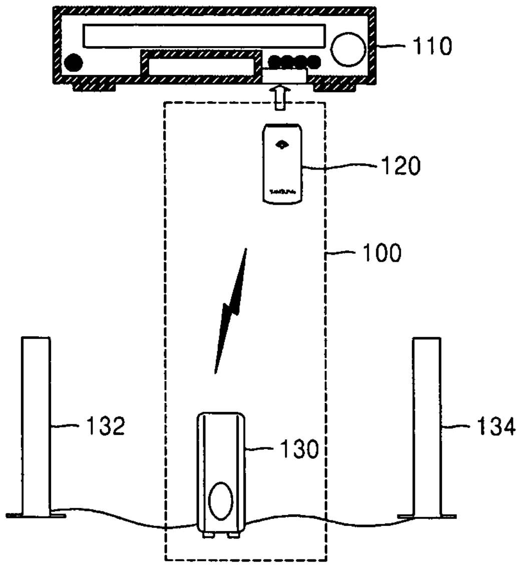
FIG. 1 is a diagram illustrating an appearance of a wireless rear speaker expanding apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating an appearance of a wireless rear speaker expanding apparatus according to an embodiment of the present invention. Referring to FIG. 1, reference number 110 indicates a main body, reference number 100 indicates a wireless rear speaker expanding unit, reference number 120 indicates a card-type transmission module, and reference number 130 indicates a reception module. Reference numbers 132 and 134 indicate left and right rear channel speakers, respectively. It is understood that many different types of audio components may be connected to the main body 110, including different types of subwoofers, additional surround sound speakers, etc.

The main body 110 reads a compression data stream from a recording medium, such as a DVD, decodes the compression data stream into a 5.1-channel audio stream, and separates the 5.1-channel audio stream into a 2.1-channel audio stream and a rear channel audio stream. The compression data stream is preferably, although not necessarily, an MPEG-2 compression stream. Hereinafter, the compression data stream will be referred to as an MPEG-2 compression stream. However, it is understood that the compression data stream is not limited to this. If the card-type transmission module 120 is inserted into the main body 110, the rear channel audio stream is transmitted to the reception module 130. At this time, the reception module 130 decodes the received rear channel audio stream into 2-channel audio signals, amplifies the decoded audio signals, and outputs the signals to the rear left speaker 132 and the rear right speaker 134. It is understood that the reception module 130 may output signals to components other than the rear left speaker 132 and rear right speaker 134. For instance, the reception module 130 may instead output signals to front left and front right speakers, to a subwoofer, to a center speaker, and/or to additional speakers.

Figure 2:
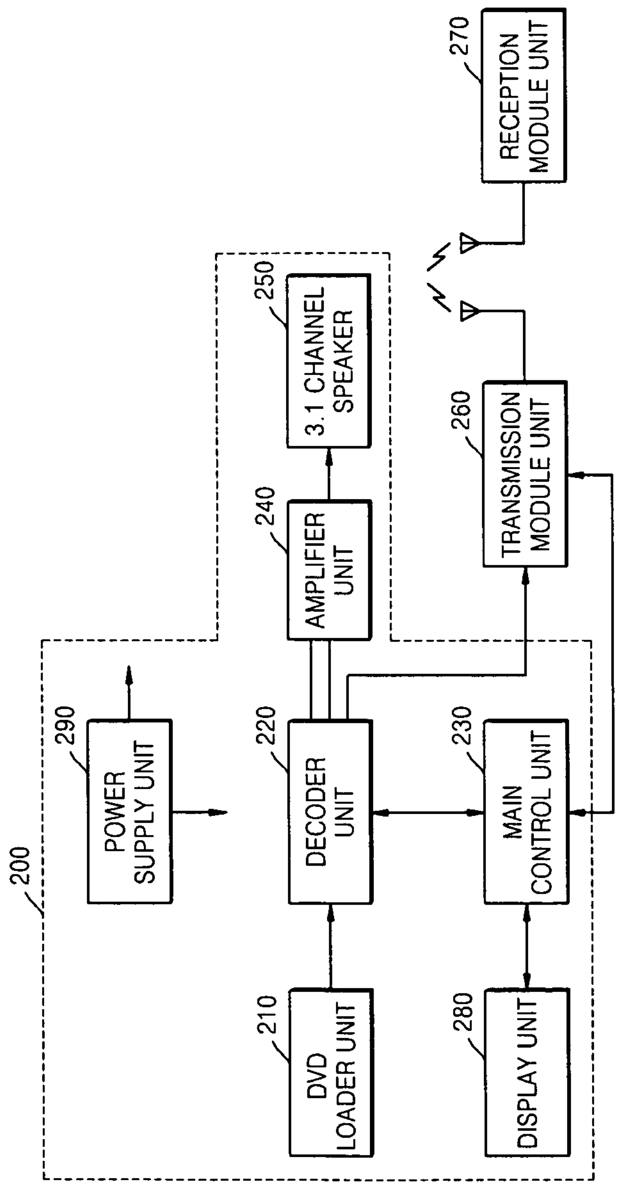
FIG. 2 is a block diagram of the wireless rear speaker expanding apparatus illustrated in FIG. 1 according to an embodiment of the present invention.

FIG. 2 is a block diagram of a wireless rear speaker expanding apparatus according to an embodiment of the present invention. Referring to FIG. 2, the wireless rear speaker expanding apparatus comprises a main body unit 200, a transmission module unit 260, and a reception module unit 270.

The main body unit 200 decodes an MPEG 2 stream of a recording medium, such as a DVD, into multiple channels, for example, into a 5.1-channel audio stream, separates the 5.1-channel audio stream into a 2.1-channel audio stream and a rear channel audio stream, detects whether the transmission module unit 260 is mounted to the main body unit 200, and switches the rear channel audio stream to a wireless or wired transmission mode.

The transmission module unit 260 is preferably formed as a card-type unit detachably mounted on the main body unit 200. It is understood that the transmission module unit 260 is not limited to being a card-type unit. The transmission module unit 260 modulates the rear channel audio stream separated in the main body unit 200 into a wireless signal, and transmits the wireless signal through an antenna. At this time, the transmission module unit 260 may preferably transmit a radio frequency (RF) signal by using a 2.4 GHz wireless channel. In another embodiment, the transmission module unit 260 may modulate a multi-channel audio stream output from the main body unit 200 into a wireless signal. It is understood that the transmission module unit 260 may also transmit frequencies other than a 2.4 GHz wireless channel, and may modulate audio streams other than multi-channel audio streams.

The reception module unit 270 decodes the rear channel audio stream transmitted through wires or wirelessly from the transmission module unit 260, and amplifies the received signal as a rear channel audio signal. Additionally, the invention is not limited to using only one transmission module unit 260 and one reception module unit 270. Instead, multiple transmission module units and reception module units may be used in conjunction with each other to transmit wireless signals from the main body unit 200 to various audio components.

The main body unit 200 will now be explained in more detail. A loader unit 210, such as a DVD loader unit 210, reads an MPEG 2 compression stream from a recording medium, such as a DVD. Although illustrated as a DVD loader unit 210, it is understood that the loader unit may instead load VHS tapes, CDs, and/or other types of recording media. A decoder unit 220 decodes the MPEG compression stream read from the DVD loader unit 210 into a 5.1-channel audio stream, and separates a 3.1-channel audio stream and a rear channel audio stream from the 5.1-channel audio stream.

After power is turned on, a main control unit 230 detects a system clock generated in the transmission module unit 260, thereby detecting whether the transmission module unit 260 is mounted to the main body 200. If the mounting of the transmission module unit 260 is detected, the main control unit 230 switches an operation mode to a wireless transmission mode and controls ID settings in order to synchronize the transmission module unit 260 with the reception module 270, and if the mounting is not detected, the main control unit 230 switches an operation mode to a wired transmission mode. According to another embodiment, the main control unit 260 detects whether the transmission module unit 260 is mounted, and controls the wireless or wired output of the multi-channel audio stream. That is, if the mounting of the transmission module unit 260 is detected, the main control unit 230 outputs the multi-channel audio signal through a wireless transmission module unit 260, and if the mounting of the transmission module unit 260 is not detected, the main control unit 230 displays wireless speaker checking information, and then outputs the multi-channel audio signal through speakers connected to the main control unit 230 by wires.

A display unit 280 displays the wireless speaker connection checking information which is generated when the main control unit 230 does not detect the mounting of the transmission module unit 260. The display unit 280 may be many different types of display units, such as, for example, an LCD screen, and may be mounted in various places. For example, the display unit 280 may be mounted on the main control unit 230. Alternatively, the display unit 280 may be mounted on the transmission module unit 260 or the reception module unit 270. Additionally, there may be multiple display units 280 mounted on multiple components.

An amplifier unit 240 converts the 3.1-channel audio stream separated in the decoder unit 220, into a pulse width modulation (PWM) signal, power-switches the PWM signal, and extracts a 2.1-channel audio signal.

3.1-channel speakers 250 reproduce the 3.1-channel audio signal extracted in the amplifier unit 240. For example, the 3.1-channel audio signal is output through a front left speaker, a front right speaker, a center speaker, and a subwoofer speaker. It is understood that the 3.1 channel speakers 250 may instead be other types of speakers as well.

A power supply unit 290 supplies power each component shown in FIG. 2 by using a switching mode power supply (SMPS).

Figure 3:
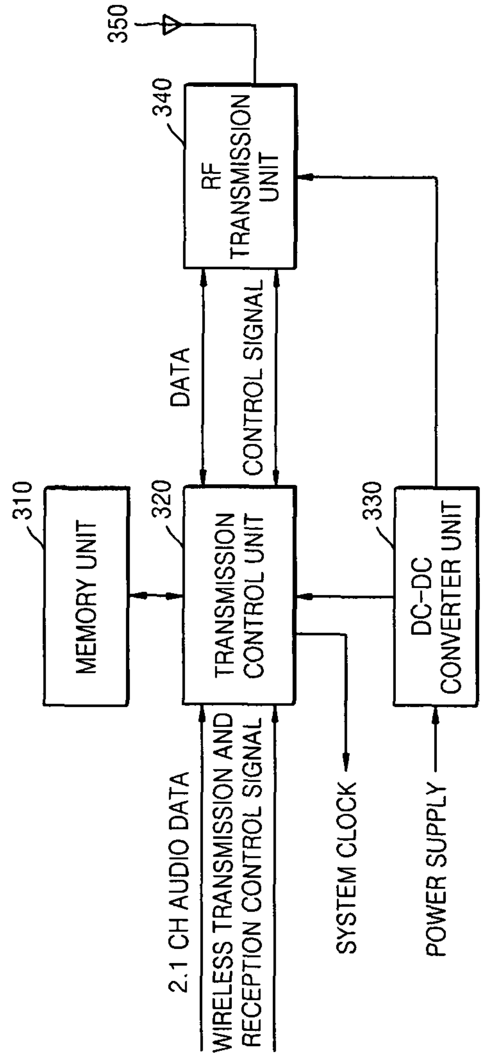
FIG. 3 is a detailed diagram illustrating the transmission module unit illustrated in FIG. 2 according to an embodiment of the present invention.

FIG. 3 is a detailed diagram illustrating the transmission module unit 260 illustrated in FIG. 2 according to an embodiment of the present invention. A memory unit 310 stores an operational program of a transmission control unit 320. It is understood that the memory unit 310 can be many different types of memories, such as a ROM memory, a flash drive, etc.

The transmission control unit 320 changes the sampling rate of a rear channel audio stream, which is input at a multi sampling rate (for example, 192 KHz, 96 KHz, 48 KHz, 44.1 KHz, . . . ), into a reference sampling rate (for example, 48 KHz). The transmission control unit 320 compresses the audio stream through subband coding, selects a signal modulation method for wireless transmission according to a wireless transmission and reception control signal inputted from the main control unit 230 of the main body 200, and controls RF transmission of an RF transmission unit 340. For example, a hopping method or a direct sequence (DS) method may be used as the signal modulation method. Also, the transmission control unit 320 generates a system clock if power is turned on. The transmission control unit 320 requests confirmation of the ID setting of the reception module unit 270 by communicating with the RF transmission unit 340, and receives the ID setting confirmation information.

In a transmission mode, the RF transmission unit 340 modulates the rear channel audio stream generated in the transmission control unit 320 according to the signal modulation method selected by the transmission control unit 320, and wirelessly transmits the modulated signal through an antenna 350. Also, in a reception mode, the RF transmission unit 340 receives the ID setting confirmation information from the RF reception unit 430.

A DC-DC converter unit 330 converts power supplied from the power supply unit 270 into direct current (DC) voltage, which is required by each component shown in FIG. 3.

Figure 4:
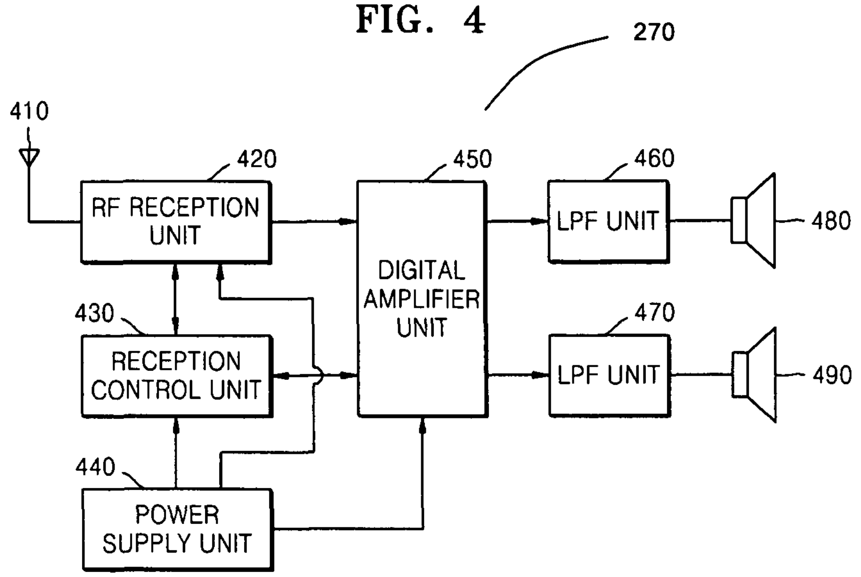
FIG. 4 is a detailed diagram illustrating the reception module unit illustrated in FIG. 2 according to an embodiment of the present invention.

FIG. 4 is a detailed diagram illustrating the reception module unit 270 illustrated in FIG. 2 according to an embodiment of the present invention. An RF reception unit 420 demodulates a rear channel audio stream received through an antenna 410 into an audio signal using a predetermined demodulation algorithm.

A digital amplifier unit 450 converts the rear channel audio signal demodulated in the RF reception unit 420 into a PWM signal and power-switches the signal. A first LPF unit 460 low-pass filters the signal power-switched in the digital amplifier unit 450, and extracts a rear left channel audio signal. A second LPF unit 470 low-pass filters the signal power-switched in the digital amplifier unit 450, and extracts a rear right channel audio signal. Left and right speakers 480 and 490 reproduce sound configured to be played out of the left and right channels, respectively, from the left and right channel audio signals output from the first LPF unit 460 and the second LPF unit 470, respectively.

A reception control unit 430 subband decodes the rear channel audio signal demodulated in the RF reception unit 420, changes the reception method of the RF reception unit to a variety of reception modes, and controls the power-switching level of the digital amplifier unit 450 according to a volume control level inputted from an outside source, such as input from a user. Also, according to an ID setting command received through the RF reception unit 420, the RF reception control unit 430 sets an ID for synchronization with the transmission module unit 260, and transmits the ID setting confirmation information.

A power supply unit 440 preferably generates power required for each component shown in FIG. 4 by using an SMPS. However, it is understood that the power supply unit 440 is not required to use an SMPS.

Figure 5:
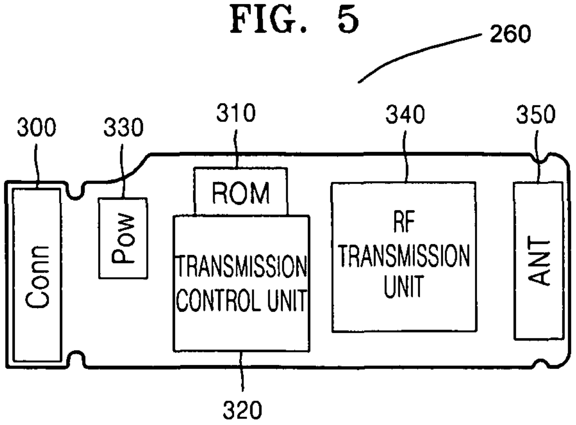
FIG. 5 is a diagram illustrating a card-type board of a transmission module unit illustrated in FIG. 2 according to an embodiment of the present invention.

FIG. 5 is a diagram illustrating a card-type board of the transmission module unit 260 illustrated in FIG. 2 according to an embodiment of the present invention. Referring to FIG. 5, the card-type board of the transmission module unit 260 comprises a connector 300, a memory unit 310, a transmission control unit 320, a DC-DC converter unit 330, an RF transmission unit 340, and an antenna 350. It is understood that the transmission module unit 260 may use other components instead of or in addition to the components described above and shown in FIG. 5.

Figure 6:
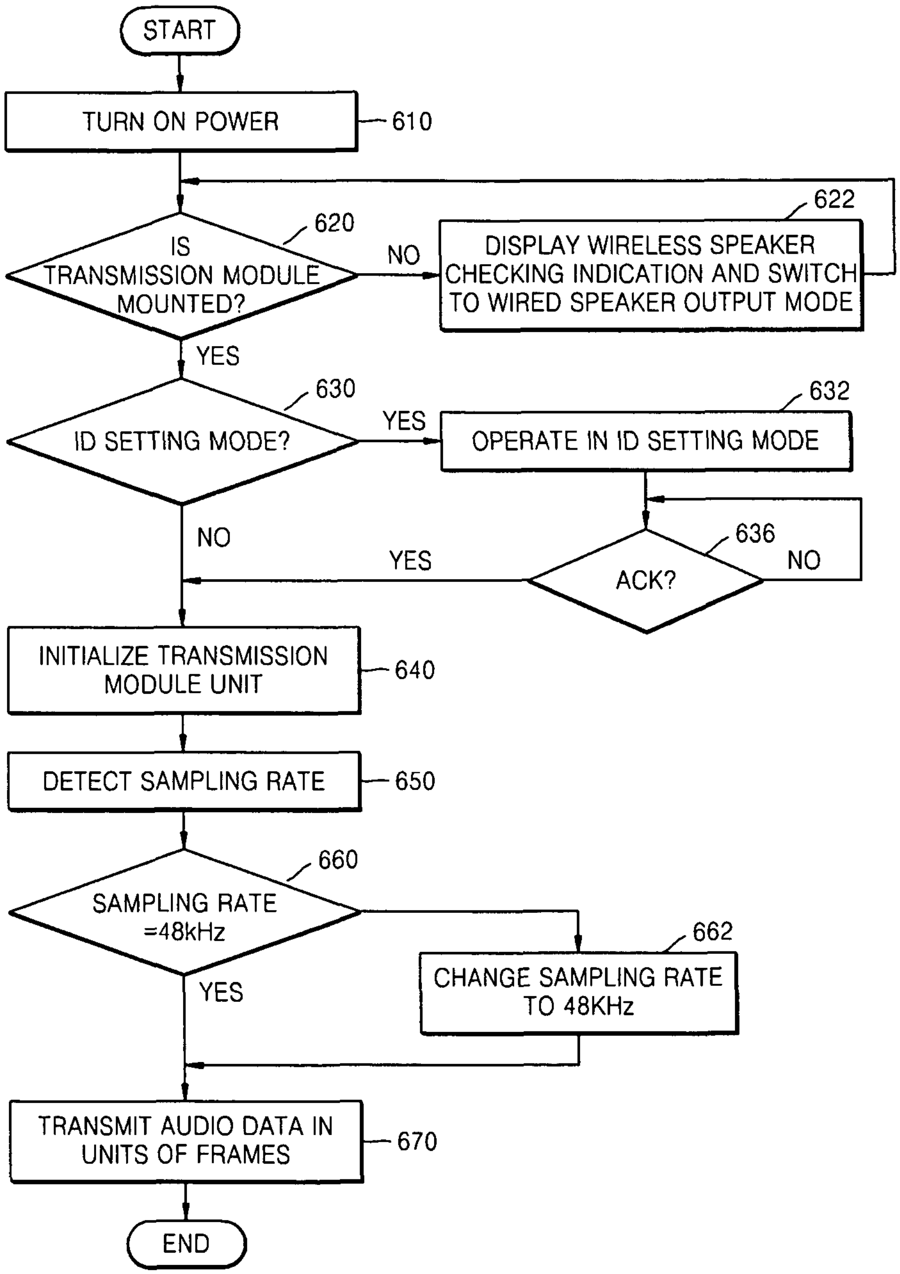
FIG. 6 is a flowchart illustrating a method of expanding a wireless rear speaker of a home theater system according to an embodiment of the present invention.

FIG. 6 is a flowchart illustrating a method of expanding a wireless rear speaker of a home theater system according to an embodiment of the present invention. First, power is turned on to supply power to the wireless rear speaker expanding apparatus in operation 610.

Then, after power is supplied to the transmission module unit 260, the main control unit 230 checks the system clock line of the transmission module unit 260 to determine whether the transmission module unit 260 is mounted in operation 620. If the main control unit 230 senses a clock in the system clock line, the main control unit 230 determines that the transmission module unit 260 is mounted. If the main control unit 230 does not sense a clock in the system clock line, the main control unit 230 determines that the transmission module unit 260 is not mounted. At this time, if the main control unit 230 determines that the transmission module unit 260 is not mounted, the display unit 280 displays a "rear check" message, and the main control unit 230 switches the operation mode to a wired speaker output mode in operation 622.

If the main control unit 230 determines that the transmission module 260 is mounted, the main control unit 230 switches the operation mode to a wireless speaker output mode and confirms whether an ID setting mode key is pressed in operation 630. In the ID setting mode, ID setting is performed so that synchronization can be performed between a transmission module and a reception module which are positioned apart from each other.

Accordingly, if the ID setting mode key is pressed, the transmission module unit 260 transmits a self-ID to the reception module unit 270 and requests the reception module to change the ID of the reception module unit 270. Then, the transmission module unit 260 checks whether it has received ID change confirmation information from the reception module unit 270 in operation 636.

Then, if the ID setting mode key signal is not input or the transmission module unit 260 determines that it has received ID change confirmation information from the reception module unit 270, the ID setting mode is released and the transmission module unit 260 is initialized in operation 640.

Then, the sampling rate of the rear channel audio signal input to the transmission module unit 260 is detected in operation 650. At this time, since the transmission capacity of the transmission module unit 260 is generally set to 1 Mbps, the sampling rate of the input signal may preferably be set to 48 KHz.

Then, the transmission control unit 320 determines whether the sampling rate is 48 KHz in operation 660. At this time, if the transmission control unit 320 determines that the sampling rate is not 48 KHz, the transmission control unit 320 changes the sampling rate of the audio signal to 48 KHz in operation 662.

If the sampling rate is 48 KHz, the RF transmission unit 340 transmits rear channel audio data in units of frames in operation 670.

Figure 7A:
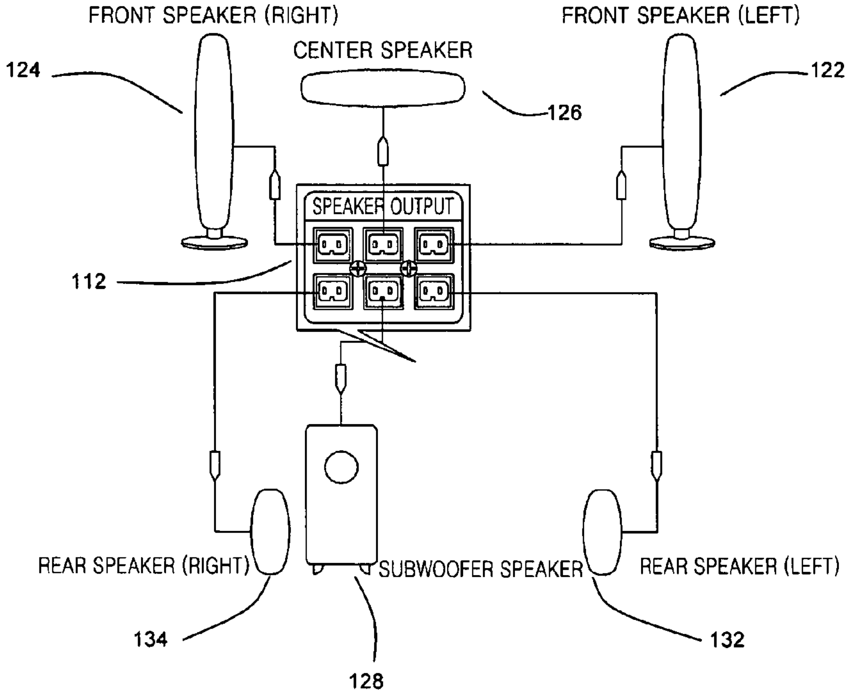
FIGS. 7A and 7B are diagrams illustrating a selective connection of wired speakers and wireless speakers according to whether a transmission module is mounted on a main body according to an embodiment of the present invention.
Figure 7B:
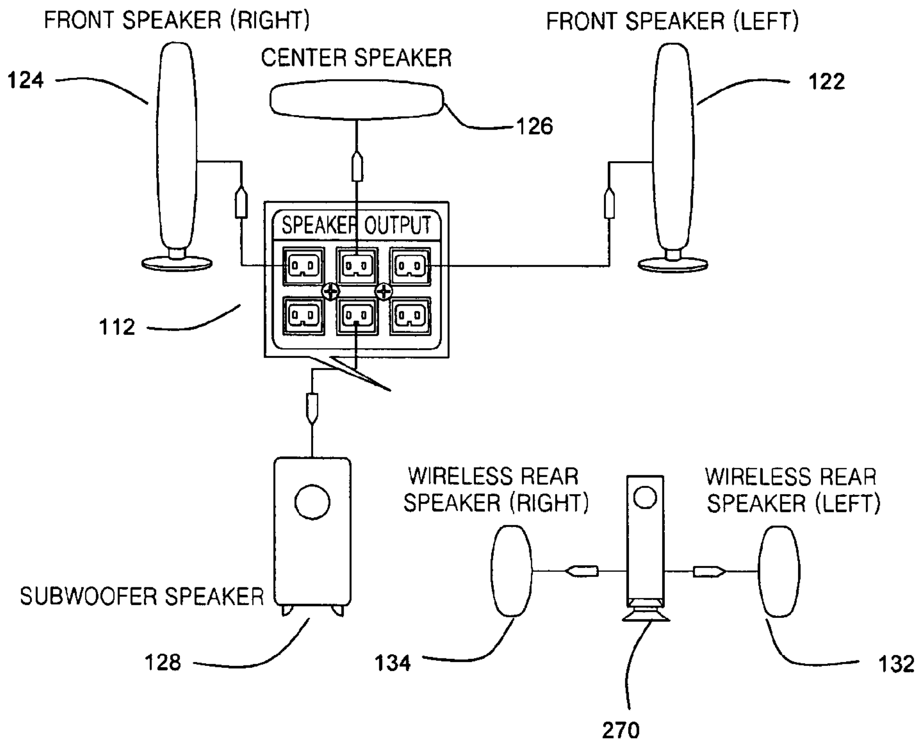

FIGS. 7A and 7B are diagrams illustrating a selective connection of wired speakers and wireless speakers according to whether the card-type transmission module 120 (as shown in FIG. 1) is mounted on a main body according to an embodiment of the present invention.

When the transmission module 120 (as shown in FIG. 1) is not mounted on the main body unit 110 (as shown in FIG. 1), front left and front right speakers 122 and 124, respectively, a center speaker 126, a subwoofer speaker 128, and rear left and rear right speakers 132 and 134, respectively, are connected to the speaker output 112 of the main body unit 110 through cables in order to reproduce audio, as shown in FIG. 7A.

When the transmission module unit 120 (as shown in FIG. 1) is mounted on the main body unit 110 (as shown in FIG. 1), rear speaker cables are removed from the main body unit and the rear left and rear right speakers 132 and 134, respectively. The rear speaker cables are then connected to speaker terminals of a 2-channel amplifier in which the wireless reception module 270 is mounted, as shown in FIG. 7A.

According to aspects of the present invention as described above, the speaker lines between the rear speakers and front speakers may be replaced with high frequency bandwidth wireless technology, and thus convenience in installation and in use can be enhanced. Also, by equipping the conventional home theater system with an external card-type transmission module, the conventional home theater system can be automatically changed to a wireless rear speaker home theater system if the transmission module is mounted on the main body. Furthermore, users can conveniently switch the home theater system to a wireless speaker mode or a wired speaker mode by attaching or detaching the transmission module.

Aspects of the present invention can also be embodied as computer readable codes on a computer readable recording medium. The computer readable recording medium is any data storage device that can store data which can be thereafter read by a computer system. Examples of computer readable recording media include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An audio reproduction system, comprising:

an audio reproduction apparatus to reproduce a multi-channel audio stream of 5.1 channels from a recording medium, to extract a rear channel audio stream, to detect whether a transmission module unit is mounted thereon, and to switch the rear channel audio stream between a wireless transmission mode and a wired transmission mode according to whether the transmission module unit is mounted on the audio reproduction apparatus;

the transmission module unit to modulate the rear channel audio stream extracted from the audio reproduction apparatus into a wireless signal and to wirelessly transmit the signal if mounted on the audio reproduction apparatus, wherein the audio reproduction apparatus is switched from the wired transmission mode to the wireless transmission mode when the transmission module unit is mounted on the audio reproduction apparatus; and a reception module unit to receive and decode the rear channel audio stream wirelessly transmitted from the transmission module unit, and to amplify the decoded signal as a rear channel audio signal.

2. The apparatus of claim 1, wherein the transmission module unit is a detachable card-type unit.

3. The apparatus of claim 1, wherein the audio reproduction apparatus comprises:

a recording medium loader unit to read a compression stream from the recording medium;

a decoder unit to decode the multi-channel audio stream read from the compression stream, and to separate the rear channel audio stream from the multi-channel audio stream; and a main control unit to detect whether the transmission module unit is mounted, and to selectively output the rear channel audio stream extracted in the decoder unit through wires or wirelessly according to whether the transmission module unit is mounted on the audio reproduction apparatus.

4. The apparatus of claim 1, wherein the transmission module unit comprises:

a transmission control unit to compress the rear channel audio stream through subband coding, and to control a transmission modulation method; and a radio frequency (RF) transmission unit to modulate the rear channel audio stream compressed in the transmission control unit into a modulated signal according to the transmission modulation method controlled by the transmission control unit, and to transmit the modulated signal.

5. The apparatus of claim 1, wherein the reception module unit comprises:

an RF reception unit to demodulate the rear channel audio stream received wirelessly;

a reception control unit to subband decode the rear channel audio signal demodulated in the RF reception unit, to change a reception method into a variety of reception modes, and to control a power-switching level;

an amplifier unit to convert the rear channel audio signal decoded in the reception control unit into a pulse width modulation (PWM) signal and to power-switch the PWM signal; and a filter unit to extract the rear channel audio signal from the signal power-switched in the amplifier unit.

6. The apparatus of claim 1, wherein the audio reproduction apparatus further comprises a display unit to display wireless speaker confirmation information, if the audio reproduction apparatus detects that the transmission module unit is not mounted.

7. The apparatus of claim 1, wherein the rear channel audio stream is wirelessly transmitted at 2.4 GHz.

* * * * *